(12) United States Patent
Wu et al.

(10) Patent No.: US 6,408,113 B1
(45) Date of Patent: Jun. 18, 2002

(54) MULTI-MIRROR REFLECTION OPTICAL SWITCH STRUCTURE

(75) Inventors: Jiun-Shyong Wu, Taoyuan Hsien; Shih-Chiang Lin, Kaohsiung; Ja-Nan Wang, Taipei Hsien, all of (TW)

(73) Assignee: Industrial Technology Research Institute, Hsinchu (TW)

( * ) Notice: Subject to any disclaimer, the term of this patent is extended or adjusted under 35 U.S.C. 154(b) by 36 days.

(21) Appl. No.: 09/715,473

(22) Filed: Nov. 17, 2000

(30) Foreign Application Priority Data

Apr. 24, 2000 (TW) ........................ 89107669 A

(51) Int. Cl.[7] .................................. G02B 6/26
(52) U.S. Cl. ............................ 385/18; 385/17
(58) Field of Search ........................ 385/17, 18

(56) References Cited

U.S. PATENT DOCUMENTS

| | | | | |
|---|---|---|---|---|
| 4,815,827 A | * | 3/1989 | Lane | 350/347 |
| 5,581,643 A | * | 12/1996 | Wu | 385/17 |
| 6,144,781 A | * | 11/2000 | Goldstein et al. | 385/18 |
| 6,198,856 B1 | * | 3/2001 | Schroeder et al. | 385/17 |
| 6,317,530 B1 | * | 11/2001 | Ford | 385/17 |
| 6,327,398 B1 | * | 12/2001 | Solgaard et al. | 385/18 |

* cited by examiner

*Primary Examiner*—Akm E. Ullah
*Assistant Examiner*—Jennifer Doan
(74) *Attorney, Agent, or Firm*—J.C. Patents

(57) ABSTRACT

A multi-mirror reflection optical switch structure having two fixed reflecting mirrors and a plurality of parallel positioned double-sided reflecting mirrors, each capable of being raised or lowered. The plurality of double-sided reflecting mirrors are positioned along two to three 45° parallel axes that run from the upper lefthand corner to the lower righthand corner of the optical switch. Each double-sided reflecting mirror can be raised or lowered in order to perform the rearrangeable non-blocking one-to-one function of the 4-by-4 optical switch.

6 Claims, 3 Drawing Sheets

MULTI-MIRROR REFLECTION OPTICAL SWITCH STRUCTURE

CROSS-REFERENCE TO RELATED APPLICATION

This application claims the priority benefit of Taiwan application Serial No. 89107669, filed Apr. 24, 2000.

BACKGROUND OF THE INVENTION

1. Field of Invention

The present invention relates to a switch structure. More particularly, the present invention relates to an optical switch structure.

2. Description of Related Art

In opto-electronic communication, an optical switch that employs a micro-electromechanical system (MEMS) has become an important component for relaying optical signals. A conventional optical switch has a one-to-one crossbar configuration. FIG. 1 is a schematic layout of the mirrors inside a conventional one-to-one crossbar optical switch.

As shown in FIG. 1, the optical switch 10, such as 4-by-4 optical switch, consists of a set of 16 reflecting mirrors $S_{ij}$ arranged into a 4-by-4 matrix configuration where i and j are integers that range from 1 to 4 respectively. An incident beam enters the optical switch from the left in one of the four input optical paths $I_1$, $I_2$, $I_3$ and $I_4$. After an internal reflection takes place somewhere inside the optical switch, the incident beam leaves the optical switch 10 from the bottom out of one of the four output optical paths $O_1$, $O_2$, $O_3$ and $O_4$. All the reflecting mirrors $S_{ij}$ can be individually raised or lowered. If the reflecting mirror $S_{11}$ is raised while all the other mirrors are lowered, the incident beam that enters the optical switch 10 through input optical path $I_1$ will leave via output optical path $O_1$. Similarly, the incident light beam from the optical path $I_1$ can be redirected to output optical paths $O_2$, $O_3$ and $O_4$ by raising the mirrors $S_{12}$, $S_{13}$ and $S_{14}$ while lowering the other mirrors, respectively. To carry out optical switching, such as redirecting the incident beam from input optical path $I_3$ to output optical path $O_4$, the reflecting mirror $S_{34}$ can be raised while all the other mirrors, including $S_{31}$, $S_{32}$, $S_{33}$ and $S_{44}$, are all lowered.

The raising and lowering of reflecting mirrors $S_{ij}$ is normally triggered by a control logic circuit (not shown in FIG. 1). By raising and lowering the reflecting mirrors in various combinations, the incident beam can be reflected by an internal mirror to any desired output optical path of the optical switch. Hence, switching multiple light sources to multiple destinations is possible. Each row and each column must have one reflecting mirror raised depending upon the incoming-to-outgoing light path. The raising and lowering of the reflecting mirrors within the optical switch is normally controlled by a hardware or software program. In general, the reflecting mirrors are moved and controlled by a micro-electromechanical system, existing in exsitent patents or papers.

The aforementioned crossbar arrangement of reflecting mirrors has one major drawback. As the switching optical paths increase, the number of reflecting mirrors inside the optical switch increases as the square of the number of input or output paths. However, putting too many reflecting mirrors inside an optical switch may lower production yield and reliability.

Aside from the one-to-one crossbar configuration, an optical switch that uses double-sided reflecting mirrors 24, 32, 34, 36 and 38 and fixed mirrors 22a, 22b is proposed in U.S. Pat. No. 4,815,827, which is shown in FIG. 2. Although multiple reflections are used to carry out the optical switching, the prior art structure still has to use many reflecting mirrors.

FIG. 2 is a schematic diagram showing an optical switch that utilizes multiple reflections. As shown in FIG. 2, the optical switch 20 includes two single-sided reflecting mirrors 22a and 22b. The reflecting mirrors 22a and 22b are parallel to each other with their reflecting surfaces facing each other. Symmetrically positioned between the two reflecting mirrors 22a and 22b is an axis Y. Along the axis Y are twelve double-sided equidistantly spaced reflecting mirrors 24. In addition, double-sided reflecting mirrors 32, 34, 36 and 38 are positioned between the reflecting mirrors 22a and 22b according to desired light-reflecting and switching conditions. With this structure, a 4-by-4 configuration switching can be achieved between input optical paths $I_1$, $I_2$, $I_3$ and $I_4$ and output optical paths $O_2$, $O_3$ and $O_4$. However, the structure requires 16 double-sided mirrors altogether in addition to the two fixed mirrors 22a and 22b. Hence, other than equalizing the propagation distance in each of the optical routes, the number of reflecting mirrors is the same as the crossbar structure shown in FIG. 1, not reducing the number of the doubled-side reflecting mirrors.

In short, the one-by-one crossbar configuration inside the optical switch in FIG. 1 uses the largest number of reflecting mirrors. When a micro-electromechanical system is incorporated into the optical switch, the area needed to form the optical switch is proportional to the number of reflecting mirrors. In other words, the area required to form the optical switch is large when the one-by-one crossbar configuration is used. Hence, system production yield, system reliability and production cost all will be affected. If the number of reflecting mirrors inside the optical switch can be reduced without compromising its function, the manufacturing area can be reduced considerably. In addition, when the number of reflecting mirrors is reduced, circuits for driving the reflecting mirror are correspondingly reduced, and possible errors, chance of failures and power consumption of the optical switch are all lowered. Consequently, reducing the number of reflecting mirrors inside an optical switch not only improves the fabrication of internal optics, but also reduces complexity of control circuit elements as well.

SUMMARY OF THE INVENTION

Accordingly, one object of the present invention is to provide a multi-mirror reflection optical switch structure capable of reducing the number of reflecting mirrors used and hence the required area of the optical switch.

A second object of the invention is to provide a multi-mirror reflection optical switch structure capable of simplifying control circuitry inside the optical switch by reducing the number of reflecting mirrors.

A third object of the invention is to provide a multi-mirror reflection optical switch structure capable of reducing operational error, failure rate and power consumption because of reducing the number of reflecting mirrors.

To achieve these and other advantages and in accordance with the purpose of the invention, as embodied and broadly described herein, the invention provides a 4-by-4 optical switch structure. The optical switch includes a first and a second fixed reflecting mirror, a first double-sided reflecting mirror group that includes a first, a second and a third double-sided reflecting mirror and a second double-sided reflecting mirror group that includes a fourth, a fifth and a sixth double-sided reflecting mirror. The reflecting side of the first and the second fixed reflecting mirrors are facing each other. The two fixed mirrors are parallel to each other and symmetrically positioned about an axis of symmetry. The first, the second and the third double-sided reflecting mirrors are positioned at equal distances from each other along a symmetric axis between the first fixed reflecting mirror and the axis of symmetry. The fourth, the fifth and the sixth double-sided reflecting mirrors are positioned at equal distances from each other along a symmetric axis between the second fixed reflecting mirror and the axis of symmetry. The first and the fourth, the second and the fifth, the third and the sixth double-side reflecting mirrors are symmetrically positioned. Furthermore, the first, the second, the third, the fourth, the fifth and the sixth reflecting mirrors all are capable of being raised or lowered to carry out optical switching. By controlling the raising and lowering of the six movable double-sided reflecting mirrors, incoming light is permitted to reflect between the first and the second fixed reflecting mirrors. Optical switching is achieved by raising one or more of the six double-sided reflecting mirrors.

The invention also provides a second 4-by-4 optical switch structure. The optical switch includes a first and a second fixed reflecting mirror, a first double-sided reflecting mirror, a first double-sided reflecting mirror group that includes a second and a third double-sided reflecting mirror and a second double-sided reflecting mirror group that includes a fourth and a fifth double-sided reflecting mirror. The reflecting side of the first and the second fixed reflecting mirrors are facing each other. The two fixed mirrors are parallel to each other and symmetrically positioned about an axis of symmetry. The first double-sided mirror is parallel to and positioned on the axis of symmetry. The second double-sided reflecting mirror is positioned along a symmetrical axis between the first fixed reflecting mirror and the axis of symmetry. The third double-sided mirror is positioned along a symmetric axis between the second fixed reflecting mirror and the axis of symmetry. The centers of the first and the third double-sided reflecting mirrors and the second fixed reflecting mirror are aligned. Similarly, the centers of the first and the second double-sided reflecting mirrors and the first fixed reflecting mirror are aligned. The second double-sided reflecting mirror group is positioned next to the first double-sided reflecting mirror group. The fourth double-sided mirror is positioned along a symmetric axis between the first fixed reflecting mirror and the axis of symmetry. The fifth double-sided mirror is positioned along a symmetric axis between the second fixed reflecting mirror and the axis of symmetry. All five double-sided reflecting mirrors are capable of being raised or lowered to carry out optical switching. By controlling the raising and lowering of the five double-sided reflecting mirrors, incoming light is permitted to reflect between the first and the second fixed reflecting mirrors. Optical switching is achieved by raising one or more of the five double-sided reflecting mirrors.

The invention also provides a third 4-by-4 optical switch structure. The optical switch includes a first and a second fixed reflecting mirror, a first double-sided reflecting mirror group that includes a first and a second double-sided reflecting mirror, a second double-sided reflecting mirror group that includes a third and a fourth double-sided reflecting mirror and a fifth double-sided reflecting mirror. The reflecting side of the first and the second fixed reflecting mirrors are facing each other. The two fixed mirrors are parallel to each other and symmetrically positioned about an axis of symmetry. The first double-sided mirror is positioned along a symmetric axis between the first fixed reflecting mirror and the axis of symmetry. The second double-sided mirror is positioned along a symmetric axis between the second fixed reflecting mirror and the axis of symmetry. The second double-sided reflecting mirror group is positioned next to the first double-sided reflecting mirror group. The third double-sided mirror is positioned along a symmetric axis between the first fixed reflecting mirror and the axis of symmetry. The fourth double-sided mirror is positioned along a symmetric axis between the second fixed reflecting mirror and the axis of symmetry. The fifth double-sided reflecting mirror lies on the axis of symmetry close to the second double-sided reflecting mirror group. The fifth double-sided reflecting mirror is positioned about one mirror length distance away from the symmetrical point of the symmetric axis of the third and fourth double-sided reflecting mirrors. All five double-sided reflecting mirrors are capable of being raised or lowered to carry out optical switching. By controlling the raising and lowering of the five double-sided reflecting mirrors, incoming light is permitted to reflect between the first and the second fixed reflecting mirrors. Optical switching is achieved by raising one or more of the five double-sided reflecting mirrors.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
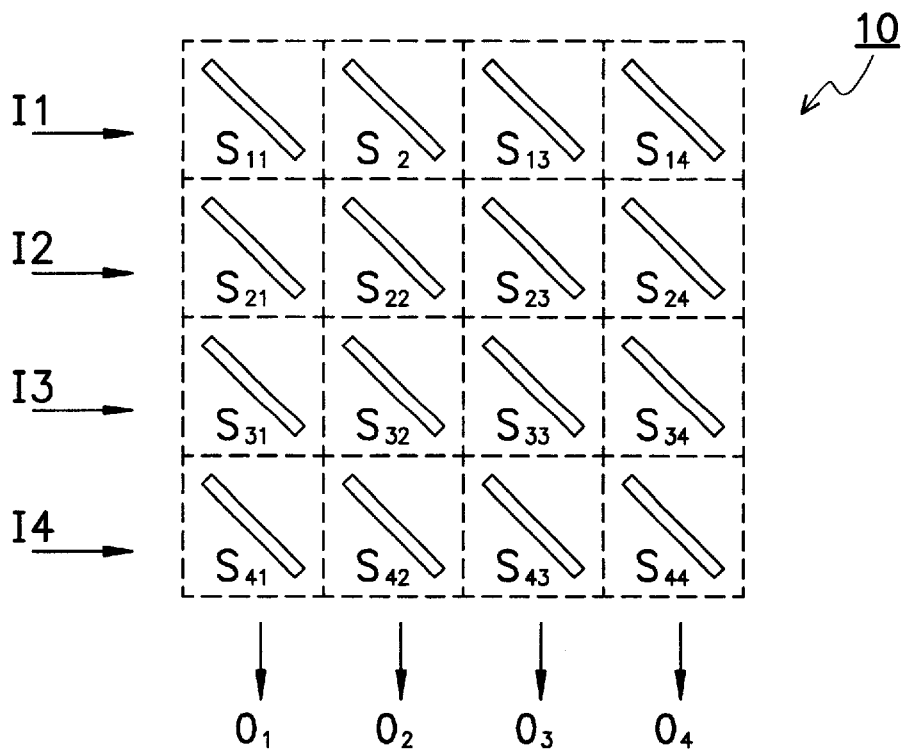
FIG. 1 is a schematic diagram of the crossbar mirrors inside a conventional 4-by-4 optical switch.
Figure 2:
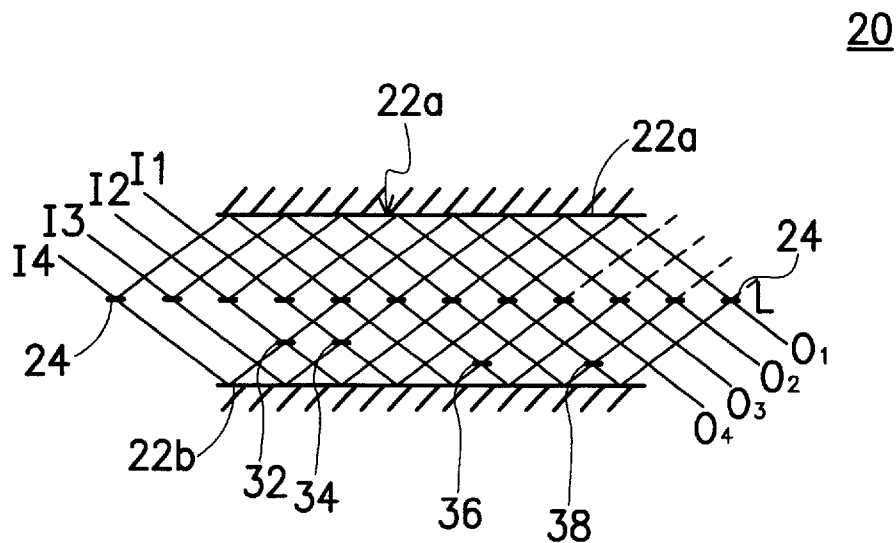
FIG. 2 is a schematic diagram showing another conventional 4-by-4 optical switch that utilizes multiple reflections.

Reference will now be made in detail to the present preferred embodiments of the invention, examples of which are illustrated in the accompanying drawings. Wherever possible, the same reference numbers are used in the drawings and the description to refer to the same or like parts.

A multi-mirror reflection optical switch structure based on the multiple reflection of light is provided in this invention. Optical switching is possible by utilizing geometric theory of reflection, movable double-sided reflecting mirrors and a set of fixed reflecting mirrors. In other words, incoming light rays and outgoing light rays have rearrangeable non-blocking one-to-one correspondent characteristics. The switching relationship between incoming and outgoing light rays is generally referred to as grouping states. In this invention, three special configurations of the optical switch structure are provided for different hardware demands. In the following embodiments, the optical path is defined by that the incoming light is reflected by the fixed single-sided reflecting mirrors when all the double-sided reflecting mirrors are lowered. For example, incoming light entering the optical switch from the input terminal $I_1$ will be reflected by the fixed single-sided reflecting mirror to the output terminal $O_1$. This is defined as the optical path 1. Other optical path such as 2 and 3 and sometimes 4 can be similarly defined.

Following will describe the three configurations of the optical switch structure first, and follows a discussion of operations for the double-side reflecting mirrors.

Figure 3:
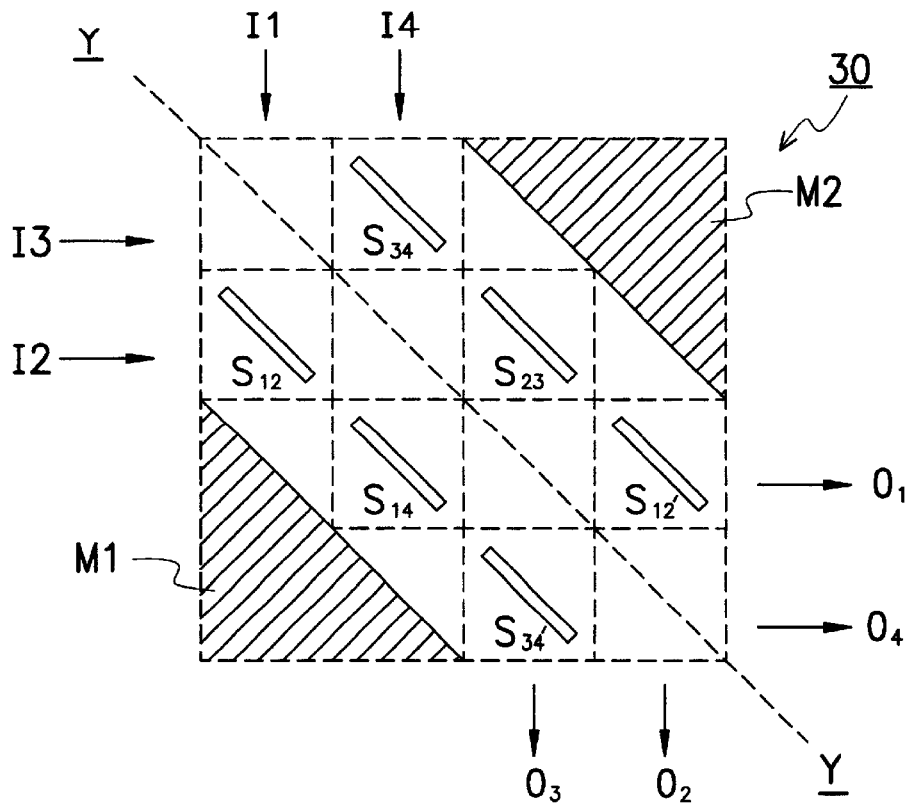
FIG. 3 is a schematic diagram of a multi-mirror reflection 4-by-4 optical switch according to a first preferred embodiment of this invention.

FIG. 3 is a schematic diagram of a multi-mirror reflection 4-by-4 optical switch 30 according to a first preferred embodiment of this invention. The optical switch 30 includes a first and a second fixed reflecting mirror M2 and M1, a first double-sided reflecting mirror group that includes a first $S_{34}$, a second $S_{23}$ and a third $S'_{12}$ double-sided reflecting mirror, and a second double-sided reflecting mirror group that includes a fourth $S_{12}$, a fifth $S_{14}$ and a sixth $S'_{34}$ double-sided reflecting mirror. The reflecting surfaces of the fixed reflecting mirrors M1 and M2 are facing each other, symmetrically positioned on each side of and parallel to a symmetric axis Y. The first $S_{34}$, the second $S_{23}$ and the third $S'_{12}$ double-sided reflecting mirrors are equidistantly positioned along a symmetric axis between the first fixed reflecting mirror M2 and the symmetric axis Y. The fourth $S_{12}$, the fifth $S_{14}$ and the sixth $S'_{34}$ double-sided reflecting mirrors are equidistantly positioned along a symmetric axis between the second fixed reflecting mirror M1 and the symmetric axis Y. The first $S_{34}$ and the fourth $S_{12}$, the second $S_{23}$ and the fifth $S_{14}$, and the third $S'_{12}$ and the sixth $S'_{34}$ double-sided reflecting mirrors are parallel to each other, respectively. In other words, in the mirror array, a fixed reflecting mirror M2 is positioned at the upper righthand corner while another fixed reflecting mirror M1 is positioned at the lower lefthand corner. The two fixed reflecting mirrors M1 and M2 are single-sided reflecting mirrors with their reflecting surfaces facing each other and parallel to each other. The area between the two reflecting surfaces of the fixed mirrors M1 and M2 is used for positioning the double-sided reflecting mirrors $S_{ij}$ (i,j=1~4). In this example, the double-sided reflecting mirrors are $S_{12}$, $S_{34}$, $S_{14}$, $S_{23}$, $S'_{34}$ and S'12. All these double-sided reflecting mirrors $S_{12}$, $S_{34}$, $S_{14}$, $S_{23}$, $S'_{34}$ and $S'_{12}$ are oriented in a direction parallel to the reflecting surfaces of both the first and the second fixed reflecting mirrors M2 and M1. The raising and lowering of the double-sided reflecting minors $S_{12}$, $S_{34}$, $S_{14}$, $S_{23}$, $S'_{34}$ and $S'_{12}$ is controlled by control logic units. Through the fixed reflecting mirrors M1 and M2 and various combinations of the double-sided reflecting mirrors $S_{12}$, $S_{34}$, $S_{14}$, $S_{23}$, $S'_{34}$ and $S'_{12}$, optical switching is achieved.

When all the double-sided reflecting mirrors $S_{12}$, $S_{34}$, $S_{14}$, $S_{23}$, $S'_{34}$ and $S'_{12}$ are lowered, incoming light through input terminals $I_1$–$I_4$ will be reflected solely by the fixed reflecting mirrors M1 and M2. Hence, the light rays will be re-routed to output terminals $O_1$–$O_4$ respectively. Optical path 1 is defined as the route of a light ray that enters the input terminal $I_1$, reflects off the second fixed reflecting mirror M1 and finally emerges at the output terminal $O_1$. Optical paths 2~4 are similarly defined.

To carry out optical switching, some of the double-sided reflecting mirrors $S_{12}$, $S_{34}$, $S_{14}$, $S_{23}$, $S_{34'}$ and $S_{12'}$ are raised under control logic units. For example, a light ray entering from the first input terminal $I_1$ and emerging at the second output terminal $O_2$ requires the raising the double-sided mirror $S_{12}$ while maintaining the other double-sided mirrors in the lowered position. Hence, incoming light from the input terminal $I_1$ of the optical switch 30 is reflected by the double-sided mirror $S_{12}$ to the fixed reflecting mirror M2, which is in turn reflected to output terminal $O_2$. Alternatively, identical switching can be obtained by raising the double-sided reflecting mirror $S_{12'}$ while keeping the other double-sided reflecting mirrors in the lowered position. Similarly, light entering from the other input terminals $I_1$ $I_2$, $I_3$ and $I_4$ can also be re-routed to various output terminals $O_1$, $O_2$, $O_3$ and $O_4$ by raising and lowering the double-sided reflecting mirrors $S_{12}$, $S_{34}$, $S_{14}$, $S_{23}$, $S_{34'}$ and $S_{12'}$. Hence, the functions of a 4-by-4 optical are implemented. The algorithm for controlling the double-sided reflecting mirrors $S_{12}$, $S_{34}$, $S_{14}$, $S_{23}$, $S_{34'}$ and $S_{12'}$ to be lowered or raised will be discussed hereinafter.

In FIG. 3, the double-sided reflecting mirrors are positioned along two parallel axes. Both parallel axes run from the upper lefthand corner to the lower righthand corner. The number of the double-sided reflecting mirrors is reduced from 16 in a conventional optical switch to just 6 in this embodiment. Consequently, the control circuits necessary for driving the reflecting mirrors are also reduced.

Figure 4:
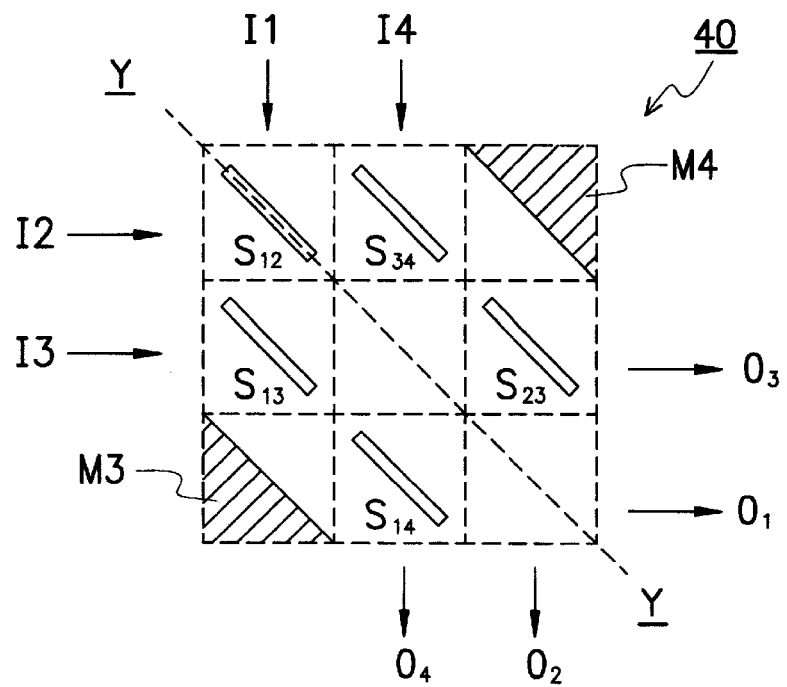
FIG. 4 is a schematic diagram of a multi-mirror reflection 4-by-4 optical switch according to a second preferred embodiment of this invention.

FIG. 4 is a schematic diagram of a multi-mirror reflection 4-by-4 optical switch 40 according to a second preferred embodiment of this invention. In this embodiment, the number of double-sided reflecting mirrors is the lowest and the optical switch is most compact and minimized.

As shown in FIG. 4, the optical switch 40 includes a first and a second fixed reflecting mirror M4 and M3, a first double-sided reflecting mirror $S_{12}$, a first double-sided reflecting mirror group that includes a second $S_{34}$ and a third $S_{13}$ double-sided reflecting mirror, and a second double-sided reflecting mirror group that includes a fourth $S_{23}$ and a fifth 814 double-sided reflecting mirror. The reflecting surface of the fixed reflecting mirrors M3 and M4 are facing each other, symmetrically positioned on each side of and parallel to a symmetric axis Y. The first double-sided reflecting mirror $S_{12}$ is positioned on and parallel to the symmetric axis Y. The second double-sided reflecting mirror $S_{34}$ is positioned along a symmetric axis between the first fixed reflecting mirror M4 and the symmetric axis Y. The third double-sided reflecting mirror $S_{13}$ is positioned along a symmetric axis between the second fixed reflecting mirror M3 and the symmetric axis Y. The centers of the first $S_{12}$ and the third $S_{13}$ double-sided reflecting mirrors and the second fixed reflecting mirror M3 are aligned. The second double-sided reflecting mirror group is positioned close to the first double-sided reflecting mirror group. The fourth double-sided reflecting mirror $S_{23}$ is positioned along a symmetric axis between the first fixed reflecting mirror M4 and the axis of symmetry Y. The fifth double-sided reflecting mirror $S_{14}$ is positioned along a symmetric axis between the second fixed reflecting mirror M3 and the axis of symmetry Y. In the double-sided reflecting mirror array, the first fixed reflecting mirror is positioned at the upper righthand corner while the second fixed reflecting mirror M3 is positioned at the lower lefthand corner. The double-sided reflecting mirrors $S_{34}$, $S_{23}$, $S_{13}$, $S_{12}$ and $S_{14}$ are located within the region demarcated by the 45° reflecting surfaces of the two fixed reflecting mirrors M3 and M4, All of the double-sided reflecting mirrors $S_{34}$, $S_{23}$, $SI_3$, $S_{12}$ and $S_{14}$ can be raised or lowered. In general, light entering the optical switch 40 from the upper lefthand corner, through input terminals $I_1$, $I_2$, $I_3$ and $I_4$, will emerge respectively out of the output terminals $O_1$, $O_2$, $O_3$ and $O_4$ at the lower righthand corner respectively. If all the double-sided reflecting mirrors $S_{34}$, $S_{23}$, $S_{13}$, $S_{12}$ and $S_{14}$ are raised, incoming light entering from lefthand edge of the optical switch will emerge from the lower righthand edge, and incoming light entering from the upper lefthand edge will emerge from the righthandedge. In other words, light entering from the input terminal $I_2$ emerges from the output terminal $O_2$; light entering from the input terminal $I_3$ emerges from the output terminal $O_4$; light entering from the input terminal $I_2$ emerges from the output terminal $O_1$ and light entering from the input terminal $I_4$ emerges from the output terminal $O_3$. Hence, light that enters from the input terminals $I_3$ and $I_4$ are interchanged at the output terminals $O_3$ and $O_4$. On the other hand, if all the double-sided reflecting mirrors $S_{34}$, $S_{23}$, $S_{13}$, $S_{12}$ and $S_{14}$ are lowered, incoming light entering from the input terminals $I_1$, $I_2$, $I_3$ and $I_4$ will emerge at the output terminals $O_1$, $O_2$, $O_3$ and $O_4$ at the lower rigthand corner in the same order without any optical path switching.

In the second embodiment, the double-sided reflecting mirrors are positioned along three parallel axes that run from the upper lefthand corner to the lower righthand corner. Hence, the second embodiment has one more mirror alignment axis than the first embodiment. However, the double-sided reflecting mirrors occupy a smaller area than the double-sided reflecting mirrors in the first embodiment. Moreover, the number of double-sided mirrors used is one less than the number of double-sided mirrors in the first embodiment.

Figure 5:
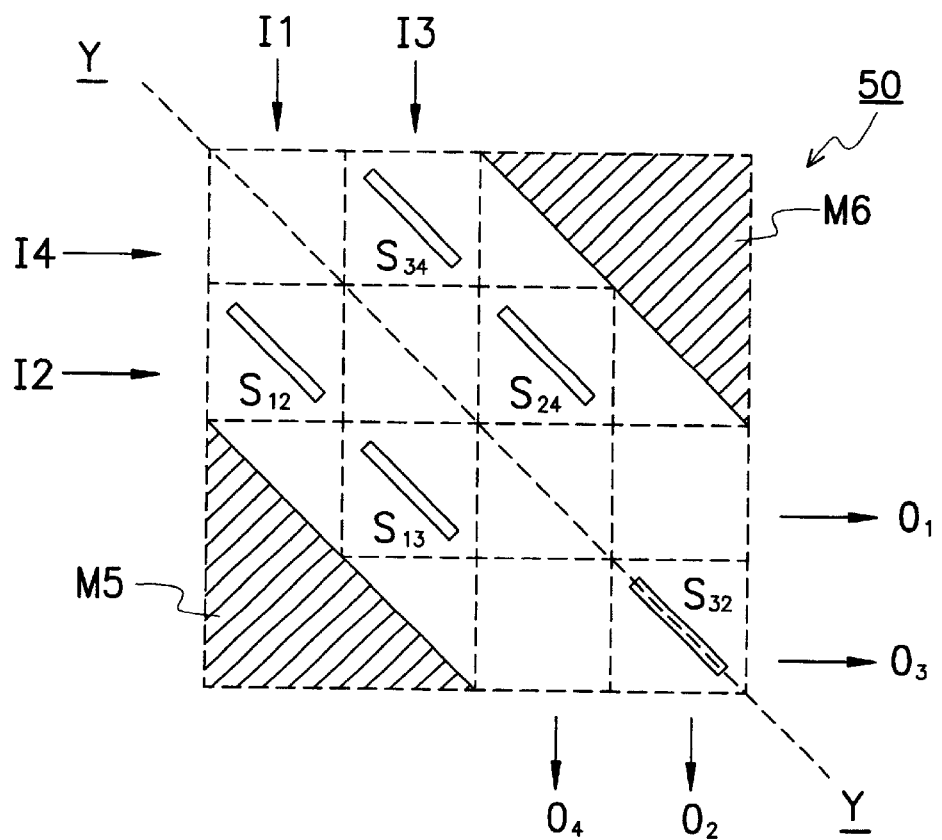
FIG. 5 is a schematic diagram of a multi-mirror reflection 4-by-4 optical switch according to a third preferred embodiment of this invention.

FIG. 5 is a schematic diagram of a multi-mirror reflection 4-by-4 optical switch 50 according to a third preferred embodiment of this invention. The optical switch 50 in the third embodiment is similar to the optical switch 30 in FIG. 3. As shown in FIG. 5, the optical switch 50 includes a first and a second fixed reflecting mirror M6 and M5, a first double-sided reflecting mirror group that includes a first $S_{12}$ and a second $S_{34}$ double-sided reflecting mirror, a second double-sided reflecting mirror group that includes a third $S_{13}$ and a fourth $S_{24}$ double-sided reflecting mirror, and a fifth double-sided reflecting mirror $S_{32}$. The reflecting surface of the fixed reflecting mirrors M5 and M6 are facing each other, symmetrically positioned on each side of and parallel to an symmetric axis Y. The first double-sided reflecting mirror $S_{12}$ is positioned along a symmetric axis between the second fixed reflecting mirror M5 and the symmetric axis Y. The second double-sided reflecting mirror $S_{34}$ is positioned along a symmetric axis between the first fixed reflecting mirror M6 and the symmetric axis Y. The second double-sided reflecting mirror group is positioned close to the first double-sided reflecting mirror group. The third double-sided reflecting mirror $S_{24}$ is positioned along a symmetric axis between the first fixed reflecting mirror M6 and the symmetric axis Y. The fourth double-sided reflecting mirror $S_{13}$ is positioned between the second fixed reflecting mirror M5 and the symmetric axis Y. The fifth double-sided reflecting mirror $S_{32}$ lies on the symmetric axis Y close to the second double-sided reflecting mirror group. The fifth double-sided reflecting mirror $S_{32}$ is about one mirror length distance away from the symmetrical point on the symmetric axis of the third $S_{24}$ and fourth $S_{13}$ double-sided reflecting mirrors. In FIG. 3, the double-sided reflecting mirrors $S_{12}$, $S_{34}$, $S_{14}$, $S_{23}$, $S'_{34}$ and $S'_{12}$ are respectively positioned along two axes that are symmetrically positioned on each side of the symmetric axis Y. In FIG. 5, the double-sided reflecting mirrors $S_{12}$, $S_{24}$, $S_{34}$ and $S_{13}$ are positioned along two axes that are symmetrically positioned on each side of the symmetric axis Y while mirror $S_{32}$ is position on he Y axis. Since the optical switching method and the definition of light paths between the optical switch shown in FIG. 5 and FIG. 3 are similar, a detailed description is not repeated here.

The optical switch 50 uses five double-sided reflecting mirrors on three parallel axes to carry out 4-by-4 switching operations, considerably less than the 16 reflecting mirrors used in a conventional optical switch.

The operation of switching inside the 4-by-4 multiple-mirror reflection optical switches shown in FIGS. 3 to 5 is described in more detail below. Since the optical switching mechanisms for the optical switches shown in FIG. 3 and FIG. 5 are similar and differ from the optical switching mechanism for the optical switch in FIG. 4, they are independently explained.

Control over the raising and lowering of the double-sided reflecting mirrors inside the optical switch structures shown in FIGS. 3 and 5 is based on a network sorting algorithm according to relative positions of the incoming and outgoing light beams. To facilitate explanation of the optical switch, a matrix des[n] is defined to represent the output position for the n-th incoming light beam. For example, des[1]=3, des[2]=2, des[3]=4, des[4]=1 indicate that incoming light entering the optical switch 40 or 60 via the input terminal $I_1$ is directed to the output terminal $O_3$, incoming light entering the optical switch 40 or 60 via the input terminal $I_2$ is directed to the output terminal $O_2$, incoming light entering the optical switch 40 or 60 via the input terminal $I_3$ is directed to the output terminal $O_4$, and incoming light entering the optical switch 40 or 60 via the input terminal $I_4$ is directed to the output terminal $O_1$.

Here, a logic "1" state represents a double-sided reflecting mirror is raised while a logic "0" state represents the double-sided reflecting mirror is lowered. For example, a parameter $S_{12}$=1 indicates the double-sided reflecting mirror $S_{12}$ is raised, and a parameter $S_{12}$=0 indicates the double-sided reflecting mirror $S_{12}$ is lowered. The control of each double-sided reflecting mirror includes two steps: (1) determining whether the double-sided reflecting mirror is raised or lowered and (2) setting a new value for each of the two correlated elements in the matrix des[n], in other words, the optical switching path. The following algorithm is an example of the double-sided reflecting mirror $S_{12}$ in FIG. 3:

IF des[1]>des[2] THEN
        $S_{12}$←1
        Swap(des[1], des[2])
    ELSE
        $S_{12}$←0
    END IF where, the symbol "←" represents assign, and the algorithm for determining whether the optical paths are switched is based on a comparison of the set value of the output terminal. When light beam entering from the input the terminal $I_1$ needs to emerge at the destination terminal $O_1$ (des[1]=2) and light entering from the input terminal $I_2$ needs to emerge at the destination terminal $O_1$ (des[2]-1), the value of des[1] is greater than des[2]. The controlling system will set the parameter $S_{12}$ of the double-sided reflecting mirror $S_{12}$ to a logic state 'I'. In other words, the double-sided reflecting mirror $S_{12}$ is raised. After the double-sided reflecting mirror $S_{12}$ is raised, light beam entering from the input terminal $I_1$ will be redirected from the original route 1 to route 2. That is, the value of des[1] and des[2] are swapped (Swap(des[1], des[2]). Conversely, the controlling system will set the parameter $S_{12}$ of the double-sided reflecting mirror $S_{12}$ to a logic state '0'. In other words, the double-sided reflecting mirror $S_{12}$ is lowered so that there is no exchange of light routes.

The aforementioned algorithm is an example of the control of a single double-sided reflecting mirror. To control a multiple of double-sided reflecting mirrors inside an optical switch, a loop algorithm is used for switching the optical paths. The algorithm for controlling various double-sided reflecting mirrors is as follows:

```
DO LOOP
    (ij); for each optical path cross-point
    IF des[i]>des [j] THEN
        S_ij←1
        Swap(des[i], des[j])
    ELSE
        S_ij←0
    END IF
END DO
```

Through the above design loop, the raising and lowering of all the double-sided reflecting mirrors is under proper control so that all of the optical paths can exchange between all input terminals and all output terminals.

Next, the method for operating the optical switch shown in FIG. 4 is described as follows. The raising and lowering of the double-sided reflecting mirrors inside the 4-by-4 optical switch structure 40 shown in FIG. 4 is also based on the relative positions of the incoming and outgoing light beams. A matrix des[n] is used to represent the output position for the n-th incoming light beam. Using the one-dimensional matrix des[n], the raising and lowering of the five double-sided reflecting mirrors is processed in parallel. Similarly, a logic state '1' represents the double-sided reflecting mirrors to be raised and a logic state '0' represents the double-sided reflecting mirrors to be lowered. For example, a parameter $S_{12}=1$ indicates the double-sided reflecting mirror $S_{12}$ is raised and a parameter $S_{12}=0$ indicates the double-sided reflecting mirror $S_{12}$ is lowered.

A two-dimensional integral matrix w[ij] can be defined for indicating that light beam entering the optical switch from the input terminal at the upper lefthand corner $I_i$ emerges from the output terminal $O_j$ at the lower righthand corner. Conversely, w[i,j]=0 indicates that the light entering the optical switch from input terminal $I_i$ at the upper lefthand corner will not emerge at the output terminal $O_j$. The algorithm is as follows:

IF (des[i]=j) THEN w[i,j]←1
ELSE w[i,j]←0 where '←' indicates assign and '=' indicates compare.

The raising and lowering of the double-sided reflecting mirrors inside the optical switch 40 in FIG. 4 can be determined by the following five equations. Here, '+' indicates an OR operation (the computation of these five equations can be carried out synchronously so that the double-sided reflecting mirrors can be raised and lowered concurrently).

(1) $S_{12}$←w[1,3]w[4,1]+w[1,1]w[4,3]+w[1,2]w[4,4]+w[4,2]+w[1,2]w[2,3];
(2) $S_{24}$←w[1,3]w[4,3];
(3) $S_{13}$←w[2,4]w[3,4];
(4) $S_{14}$←w[1,4]w[4,3];
(5) $S_{23}$←w[2,3]w[3,4]

Through the above control scheme, the raising and lowering of the double-sided reflecting mirrors inside the optical switch 50 shown in FIG. 4 can be effected and optical paths between various terminals can therefore switch.

Advantageously, the optical switch in this invention uses fewer reflecting mirrors and occupies a smaller area compared to a conventional one-by-one cross bar type optical switch.

Table 1 lists the number of reflecting mirrors used in a conventional one-by-one optical switch and the number of reflecting mirrors used in the three optical switches of this invention. In Table 1, the first column lists the configurations, the second column lists the number of reflecting mirrors used in those configurations, and the third column sts the reduced ratios in percentages of the number of reflecting mirrors relative to the number of reflecting mirrors in a one-to-one cross bar type optical switch. It is obvious from Table 1 that only one-third the number of reflecting mirrors of a conventional optical switch is used in this invention.

TABLE 1

| Configuration | Number of Mirrors | No. of Mirrors relative to No. of Mirrors in cross-bar type (in percentage) |
|---|---|---|
| One-to-one cross bar type | 16 | 100% |
| Configuration shown in FIG. 3 | 6 | 47.5% |
| Configuration shown in FIG. 4 | 5 | 31.3% |
| Configuration shown in FIG. 5 | 5 | 31.3% |

When the number of double-sided reflecting mirrors in an optical switch reduces, the circuits needed to control the raising and lowering of reflecting mirrors become more complicated. In other words, there is always a tradeoff between the number of reflecting mirrors used and the complexity of the controlling circuits. In general, to sort a fixed number of double-sided reflecting mirrors under the optimal conditions, the number of processing steps to be executed in a parallel processing network is inversely proportional to the square root of the area (that is, the number of double-sided reflecting mirrors used). The three configurations of this invention in terms of overall computational steps can be compared with the configuration of a conventional cross bar type, and the results are listed in Table 2.

(1) For a 4-by-4 optical switch, if all of the sixteen reflecting mirrors of the cross bar array can be processed in parallel, all of the operations are comparisons. In other words, the controller of each reflecting mirror must compare its own destination with the required destination of the light path in order to determine whether the reflecting mirror should be raised or lowered. Since the number of simultaneous logical operations is equal to the number of reflecting mirrors, if one optical address is considered as an unit, it requires one parallel computation and sixteen logic computations.

(2) For the 4-by-4 optical switch shown in FIG. 3, a sorting network algorithm is used for controlling the configuration of the mirrors. In each step, two operations, including a comparing operation and a storing into a register, must be executed. For parallel computation, if there is no causality between the reflecting mirrors, these operations can be carried out simultaneously. However, if there is a causality between the reflecting mirrors, the processing must be carried out in sequence. Hence, there are three parallel computations and fourteen logical computations.

(3) For the 4-by-4 optical switch shown in FIG. 4, if one optical address is considered as an unit, there are three main operations, including a comparing operation, an OR logic operation and a AND logic operation. Hence, it requires six parallel computations and fifteen logical computations.

(4) For the 4-by-4 optical switch shown in FIG. 5, a sorting network algorithm is also used for controlling the configuration of the mirrors. However, the geometric structure of the double-sided reflecting mirrors is a little different from the one shown in FIG. 3. Hence, it requires parallel computations and thirteen logical computations.

TABLE 2

| Configurations | Number of steps in parallel computations | Total number of logical computations |
|---|---|---|
| One-to-one cross bar type | 1 | 16 |
| Configuration shown in FIG. 3 | 3 | 14 |
| Configuration shown in FIG. 4 | 6 | 15 |
| Configuration shown in FIG. 5 | 3 | 13 |

As shown in Table 2, the total number of logical computations ranges from thirteen to sixteen, substantially the same as the One-to-one cross bar type. Delay caused by an increase in the parallel computation for the structure in FIG. 4 is six times that of the one-to-one cross bar type. On the other hand, delay caused by an increase in the parallel computations for the structures shown in FIGS. 3 and 5 is three times that of the one-to-one cross bar type. control, the following points may be noticed:

(1) The number of reflecting mirrors used in a multiple-reflection mirror optic switch is just one-third the number of reflecting mirrors used in a one-to-one cross bar type optical switch. As the number of reflecting mirrors decreases, the probability of mechanical failures and the number of production defects are greatly lowered. In addition, the probability of erroneous motion, the probability of failure and the power consumption of the entire optical switching system decrease.

(2) The number of components for driving the doubled-sided reflecting mirrors up or down is reduced as the number of reflecting mirrors used in the optical switch decreases, while the total number of logical Computations remains almost the same.

Hence, there is no complication of the control circuits. (3) Delay caused by an increase in simultaneous computations for the optical switch shown in FIG. 4 is the highest, almost six times that of the conventional one-to-one cross bar optical switch, However, compared with response time for raising or lowering the mirrors, the delay period is negligible and hence acceptable. Furthermore, computational delays for the optical switches shown in FIGS. 3 and 5 are only three times that of the one-to-one cross bar optical switch. Hence, the optical switches operate under the best conditions, according to algorithmic theory.

In summary, this invention provides a multiple-mirror reflection optical switch having a mechanical switching design that differs from the conventional system. In this invention, computer algorithm and geometric optics are used for planning the configuration of the double-sided reflecting mirrors. In addition, micro-electrochemical systems are directly applied to this invention so that a small and compactoptical switch having low power consumption is developed.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A four-by-four optical switch, comprising:
a first and a second fixed reflecting mirror each having a reflecting surface such that the reflecting surfaces face each other, and the first and the second reflecting mirrors are parallel to each other and symmetrically positioned on each side of a symmetric axis;
a first double-sided reflecting mirror group having a first, a second and a third double-sided reflecting mirrors, wherein the first, the second and the third double-sided reflecting mirror are equidistantly positioned along a symmetric axis between the first fixed reflecting mirror and the symmetric axis; and
a second double-sided reflecting mirror group having a fourth, a fifth and a sixth double-sided reflecting mirrors, wherein the fourth, the fifth and the sixth double-sided reflecting mirrors are equidistantly positioned along a symmetric axis between the second fixed reflecting mirror and the symmetric axis, and the reflecting surfaces of the first and the fourth double-sided reflecting mirrors, the second and the fifth double-sided reflecting mirrors and the third and the sixth double-sided reflecting mirrors are parallel to each other;
wherein the first, the second, the third, the fourth, the fifth and the sixth double-sided reflecting mirrors are converted such that a light beam is directly passed through or blocked for swapping optical paths.

2. The optical switch of claim 1, wherein the first, the second, the third, the fourth, the fifth and the sixth double-sided reflecting mirrors are coupled to a control logic unit for controlling such that the light beam is directly passed through or blocked.

3. A four-by-four optical switch, comprising:
a first and a second fixed reflecting mirror each having a reflecting surface such that the reflecting surfaces face each other, and the first and the second reflecting mirrors are parallel to each other and symmetrically positioned on each side of a symmetric axis;
a first double-sided reflecting mirror positioned on the symmetric axis such that the reflecting surface of the first double-sided reflecting mirror is parallel to the symmetric axis;
a first double-sided reflecting mirror group having a second and a third double-sided reflecting mirrors, wherein the second double-sided reflecting mirror is positioned along a symmetric axis between the first fixed reflecting mirror and the symmetric axis, the third double-sided reflecting mirror is positioned along a symmetric axis between the second fixed reflecting mirror and the symmetric axis, and the centers of the first and the third double-sided reflecting mirrors and the second fixed reflecting mirror all lie on a vertical line; and
a second double-sided reflecting mirror group having a fourth and a fifth double-sided reflecting mirrors, wherein the fourth double-sided reflecting mirror is positioned along a symmetric axis between the first fixed reflecting mirror and the symmetric axis, the fifth double-sided reflecting mirror is positioned along a symmetric axis between the second fixed reflecting mirror and the symmetric axis;
wherein the first, the second, the third, the fourth and the fifth double-sided reflecting mirrors are converted such that a light beam is directly passed through or blocked for swapping optical paths.

4. The optical switch of claim 3, wherein the first, the second, the third, the fourth and the fifth double-sided reflecting mirrors are coupled to a control logic unit for controlling such that the light beam is directly passed through or blocked.

5. A four-by-four optical switch, comprising:
a first and a second fixed reflecting mirror each having a reflecting surface such that the reflecting surfaces face each other, and the first and the second reflecting mirrors are parallel to each other and symmetrically positioned on each side of a symmetric axis;

a first double-sided reflecting mirror group having a first and a second double-sided reflecting mirrors, wherein the first double-sided reflecting mirror is positioned along a symmetric axis between the first fixed reflecting mirror and the symmetric axis, the second double-sided reflecting mirror is positioned along a symmetric axis between the second fixed reflecting mirror and the symmetric axis, a second double-sided reflecting mirror group having a third and a fourth double-sided reflecting mirrors, wherein the third double-sided reflecting mirror is positioned along a symmetric axis between the first fixed reflecting mirror and the symmetric axis, the fourth double-sided reflecting mirror is positioned along a symmetric axis between the second fixed reflecting mirror and the symmetric axis; and a fifth double-sided reflecting mirror on the symmetric axis of symmetry such that a distance between the center of the fifth double-sided reflecting mirror and a symmetric point of the third and the fourth double-sided reflecting mirrors is three times a perpendicular distance from the third or the fourth double-sided reflecting mirror to the nearest fixed reflecting mirror, wherein the first, the second, the third, the fourth and the fifth double-sided reflecting mirrors are converted such that a light beam is directly passed through or blocked for swapping optical paths.

6. The optical switch of claim 5, wherein the first, the second, the third, the fourth and the fifth double-sided reflecting mirrors are coupled to a control logic unit for controlling such that the light beam is directly passed through or blocked.

* * * * *